(12) United States Patent
Ouyang (10) Patent No.: US 12,155,501 B2
(45) Date of Patent: Nov. 26, 2024

(54) METHOD AND APPARATUS FOR BROADCASTING STATE OF HOUSEHOLD APPLIANCE, AND DEVICE

(71) Applicants: GD MIDEA AIR-CONDITIONING EQUIPMENT CO., LTD., Foshan (CN); MIDEA GROUP CO., LTD., Foshan (CN)

(72) Inventor: Min Ouyang, Foshan (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 581 days.

(21) Appl. No.: 17/437,360

(22) PCT Filed: Mar. 28, 2019

(86) PCT No.: PCT/CN2019/080037
§ 371 (c)(1),
(2) Date: Sep. 8, 2021

(87) PCT Pub. No.: WO2020/181588
PCT Pub. Date: Sep. 17, 2020

(65) Prior Publication Data
US 2022/0182257 A1 Jun. 9, 2022

(30) Foreign Application Priority Data
Mar. 11, 2019 (CN) .......................... 201910181775.6

(51) Int. Cl.
*H04L 12/28* (2006.01)
*G05B 15/02* (2006.01)

(52) U.S. Cl.
CPC .......... *H04L 12/2823* (2013.01); *G05B 15/02* (2013.01); *G05B 2219/2642* (2013.01); *H04L 2012/2841* (2013.01); *H04L 2012/285* (2013.01)

(58) Field of Classification Search
None
See application file for complete search history.

(56) References Cited

U.S. PATENT DOCUMENTS

2011/0251898 A1* 10/2011 Scott ...................... H04W 4/20
705/14.62
2013/0278384 A1 10/2013 McDowell et al.
(Continued)

FOREIGN PATENT DOCUMENTS

CN 101911064 A 12/2010
CN 104007729 A 8/2014
(Continued)

OTHER PUBLICATIONS

World Intellectual Property Organization (WIPO) International Search Report and Written Opinion for PCT/CN2019/080037 dated Dec. 5, 2019 20 pages (with translation).
(Continued)

*Primary Examiner* — Angela Nguyen
(74) *Attorney, Agent, or Firm* — Anova Law Group PLLC (57) ABSTRACT

A status broadcasting method includes receiving a broadcast instruction that is generated according to preset broadcast configuration information and status change information of a household appliance, and broadcasting a corresponding status of the household appliance according to the broadcast instruction.

19 Claims, 3 Drawing Sheets

(56) References Cited

U.S. PATENT DOCUMENTS

| | | | | |
|---|---|---|---|---|
| 2015/0156747 A1* | 6/2015 | Skaaksrud | ............ | H04L 43/10 455/456.1 |
| 2016/0378082 A1 | 12/2016 | Fisher et al. | | |
| 2018/0116040 A1* | 4/2018 | Mann | .................. | G08C 17/02 |
| 2021/0399943 A1* | 12/2021 | Luo | .................. | H04L 12/2807 |

FOREIGN PATENT DOCUMENTS

| CN | 105068434 A | 11/2015 |
|---|---|---|
| CN | 105843063 A | 8/2016 |
| CN | 106325095 A | 1/2017 |
| CN | 106452990 A | 2/2017 |
| CN | 106502119 A | 3/2017 |
| CN | 106548604 A | 3/2017 |
| CN | 107479396 A | 12/2017 |
| CN | 107561945 A | 1/2018 |
| CN | 107968828 A | 4/2018 |
| CN | 108088043 A | 5/2018 |
| CN | 108266859 A | 7/2018 |
| CN | 207732793 U | 8/2018 |
| CN | 108508317 A | 9/2018 |
| CN | 108563132 A | 9/2018 |
| CN | 108572555 A | 9/2018 |
| CN | 108650155 A | 10/2018 |
| CN | 108873718 A | 11/2018 |
| CN | 109358513 A | 2/2019 |
| CN | 109412908 A | 3/2019 |
| JP | H06139478 A | 5/1994 |
| JP | 2002207538 A | 7/2002 |
| JP | 2007193615 A | 8/2007 |
| JP | 2015179952 A | 10/2015 |
| JP | 2016063429 A | 4/2016 |
| JP | 2017041180 A | 2/2017 |
| JP | 2017204733 A | 11/2017 |
| WO | 2018163022 A1 | 9/2018 |

OTHER PUBLICATIONS

The China National Intellectual Property Administration (CNIPA) The Office Action for CN Application No. 201910181775.6 dated Mar. 3, 2020 14 Pages (with translation).
The China National Intellectual Property Administration (CNIPA) The Second Office Action for CN Application No. 201910181775.6 dated Aug. 3, 2020 13 Pages (with translation).
The China National Intellectual Property Administration (CNIPA) The Third Office Action for CN Application No. 201910181775.6 dated Feb. 20, 2021 13 Pages (with translation).
Japan Patent Office (JPO) The Office Action for JP Application No. 2021-554768 dated Oct. 4, 2022 28 Pages (Translation Included).
The European Patent Office (EPO) Extended Search Report for EP Application No. 19918711.3 dated Apr. 5, 2022 50 Pages.

* cited by examiner

METHOD AND APPARATUS FOR BROADCASTING STATE OF HOUSEHOLD APPLIANCE, AND DEVICE

CROSS-REFERENCE TO RELATED APPLICATIONS

This application is a National Stage Entry under 35 U.S.C. § 371 of International Application No. PCT/CN2019/080037, filed on Mar. 28, 2019, which claims priority to Chinese Patent Application No. 201910181775.6 with the title of "METHOD AND APPARATUS FOR BROADCASTING STATE OF HOUSEHOLD APPLIANCE, AND DEVICE," filed by GD MIDEA AIR-CONDITIONING EQUIPMENT CO., LTD. and MIDEA GROUP CO., LTD. on Mar. 11, 2019, the entire contents of both of which are incorporated herein by reference.

FIELD

The present disclosure relates to the field of household appliances technology, and particularly to a method and apparatus for broadcasting a status of a household appliance, and a device.

BACKGROUND

In home life, users often need to actively check whether some appliances have triggered a certain status that needs to be handled manually, such as the lack of water in a humidifier, the completion of rice cooking in a rice cooker, and the completion of clothes washing in a washing machine.

SUMMARY

The present disclosure aims to solve at least one of the technical problems in the related art to a certain extent.

For this, in an aspect, the present disclosure provides a method for broadcasting a status of a household appliance, which achieves broadcasting the status of the household appliance by an appliance such as an air conditioner, and allows a user to be able to know a status of a household appliance and to handle it in time, and thus improving the user experience and solving a problem that some statuses cannot be handled timely caused by forgetting or ignoring an operating status of the house appliance, when the user is busy with other things, such as doing a lot of housework or resting in the living room.

In another aspect, the present disclosure provides another method for broadcasting a status of a household appliance.

In another aspect, the present disclosure provides an apparatus for broadcasting a status of a household appliance.

In another aspect, the present disclosure provides another apparatus for broadcasting a status of a household appliance.

In another aspect, the present disclosure provides a computer device.

In still another aspect, the present disclosure provides a computer-readable storage medium.

In a first aspect, the present disclosure provides in embodiments a method for broadcasting a status of a household appliance, wherein the method is applied to a target household appliance, and the method includes:

receiving a broadcast instruction, wherein the broadcast instruction is generated according to preset broadcast configuration information and status change information of the household appliance; and broadcasting a corresponding status of the household appliance according to the broadcast instruction.

According to the method for broadcasting a status of a household appliance in embodiments of the present disclosure, a target household appliance receives a broadcast instruction, where the broadcast instruction is generated according to preset broadcast configuration information and status change information of the household appliance; and broadcasts a corresponding status of the household appliance according to the broadcast instruction, thus achieving broadcasting the status of the household appliance by an appliance such as an air conditioner to inform the user to handle it timely, thereby increasing intelligent level of the household appliance, extending the product function, and improving the user experience. Moreover, broadcasting a status of the household appliance can be realized via a local area network and a server simultaneously, and thus ensuring reliability of broadcasting the status of the household appliance by redundancy computation.

In addition, the method for broadcasting a status of a household appliance provided according to the above embodiments of the present disclosure may further include the following additional technical features.

Optionally, receiving a broadcast instruction includes: receiving the broadcast instruction transmitted by a server.

Optionally, receiving a broadcast instruction includes: receiving the status change information transmitted by the household appliance via a local area network; and judging whether the status change information meets a preset broadcast condition according to pre-stored broadcast configuration information, and generating a corresponding broadcast instruction if the broadcast condition is met.

Optionally, the method further includes: receiving the broadcast configuration information transmitted by the server; and storing the broadcast configuration information in a communication circuit, and/or storing the broadcast configuration information in an electronic controller.

Optionally, the broadcast configuration information includes an appliance identifier, status information corresponding to the appliance identifier, and a broadcast time, wherein judging whether the status change information meets a preset broadcast condition according to pre-stored broadcast configuration information and generating a corresponding broadcast instruction if the broadcast condition is met include: judging whether an appliance identifier of the household appliance matches the appliance identifier in the broadcast configuration information; if yes, judging whether the status change information matches the status information in the broadcast configuration information; if yes, judging whether a current time meets the broadcast time; and if yes, generating the corresponding broadcast instruction.

Optionally, after broadcasting a corresponding status of the household appliance according to the broadcast instruction, the method further includes: setting a target bit of a state machine to a suspended state according to the broadcast instruction.

Optionally, after setting a target bit of a state machine to a suspended state, the method further includes: judging whether the broadcast instruction currently acquired corresponds to the target bit, if yes, not broadcasting the corresponding status of the household appliance.

Optionally, after setting a target bit of a state machine to a suspended state, the method further includes: receiving a reset instruction for the target bit of the state machine, and controlling the target bit to reset.

In a second aspect, the present disclosure provides in embodiments another method for broadcasting a status of a household appliance, wherein the method is applied to a server, the method includes:

acquiring status change information transmitted by the household appliance;

judging whether the status change information meets a preset broadcast condition according to pre-stored broadcast configuration information, and generating a corresponding broadcast instruction if the broadcast condition is met; and controlling a target household appliance to broadcast a corresponding status of the household appliance according to the broadcast instruction.

According to the method for broadcasting a status of a household appliance in embodiments of the present disclosure, the server acquires status change information transmitted by the household appliance, then judges whether the status change information meets a preset broadcast condition according to pre-stored broadcast configuration information, and generates a corresponding broadcast instruction if the broadcast condition is met, and further controls a target household appliance to broadcast a corresponding status of the household appliance according to the broadcast instruction, thus achieving that the server controls an appliance, such as an air conditioner, to broadcast the status of the household appliance, and thus informing the user to handle it timely, thereby increasing intelligent level of the household appliance, extending the product function, and improving the user experience. In addition, broadcast control information of the target household appliance adopts protocol data, and the accessible device has a good expansibility.

In addition, the method for broadcasting a status of a household appliance provided according to the above embodiments of the present disclosure may further include the following additional technical features.

Optionally, the method further includes: acquiring status information transmitted by the household appliance, wherein the status information is transmitted by the household appliance at a preset time, and/or when a status of the household appliance is changed; and judging whether the status is changed according to the status information, if yes, generating the corresponding broadcast instruction.

Optionally, controlling a target household appliance to broadcast a corresponding status of the household appliance according to the broadcast instruction includes: determining a target household appliance identifier of the target household appliance; and transmitting the broadcast instruction to the target household appliance according to the target household appliance identifier, so as to allow the target household appliance to broadcast the corresponding status of the household appliance according to the broadcast instruction.

Optionally, the method further includes: receiving and storing the broadcast configuration information transmitted by a control device; converting the broadcast configuration information to be in a protocol data type and transmitting to the target household appliance, so as to allow the target household appliance to store the broadcast configuration information in the protocol data type.

Optionally, the broadcast configuration information includes an appliance identifier, status information corresponding to the appliance identifier, and a broadcast time, wherein judging whether the status change information meets a preset broadcast condition according to pre-stored broadcast configuration information and generating a corresponding broadcast instruction if the broadcast condition is met include: judging whether an appliance identifier of the household appliance matches the appliance identifier in the broadcast configuration information; if yes, judging whether the status change information matches the status information in the broadcast configuration information; if yes, judging whether a current time meets the broadcast time; and if yes, generating the corresponding broadcast instruction.

In a third aspect, the present disclosure provides in embodiments an apparatus for broadcasting a status of a household appliance, including:

an acquisition circuit, configured to receive a broadcast instruction, wherein the broadcast instruction is generated according to preset broadcast configuration information and status change information of the household appliance;

a broadcast circuit, configured to broadcast a corresponding status of the household appliance according to the broadcast instruction.

In a fourth aspect, the present disclosure provides in embodiments another apparatus for broadcasting a status of a household appliance, including:

a reception circuit, configured to acquire status change information transmitted by the household appliance;

a generation circuit, configured to judge whether the status change information meets a preset broadcast condition according to pre-stored broadcast configuration information, and generate a corresponding broadcast instruction if the broadcast condition is met; and a control circuit, configured to control a target household appliance to broadcast a corresponding status of the household appliance according to the broadcast instruction.

In a fifth aspect, the present disclosure provides in embodiments an air conditioner appliance, including: an appliance body; and an apparatus for broadcasting a status of a household appliance as described in the embodiments of the third aspect.

In a sixth aspect, the present disclosure provides in embodiments a computer device, including: a memory; and a processor, wherein the processor executes, by reading an executable program code stored in the memory, a program corresponding to the executable program code, to implement a method for broadcasting a status of a household appliance as described in the above embodiments.

In a seventh aspect, the present disclosure provides in embodiments a computer-readable storage medium having stored therein a computer program that, when executed by a processor, implements a method for broadcasting a status of a household appliance as described in the above embodiments.

The additional aspects and advantages of the present disclosure will be provided and become apparent in the following description, or would be understood through the practice of the present disclosure.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method and the apparatus for broadcasting a status of a household appliance and a device in embodiments of the present disclosure are described below with reference to the drawings.

Figure 1:
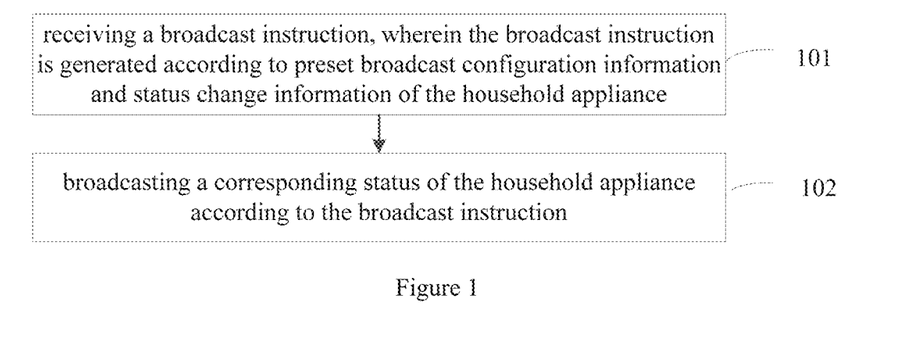
FIG. 1 is a flow chart showing a method for broadcasting a status of a household appliance provided in embodiments of the present disclosure.

FIG. 1 is a flow chart showing a method for broadcasting a status of a household appliance provided in embodiments of the present disclosure. As shown in FIG. 1, the method includes: steps 101 and 102.

At step 101, a broadcast instruction is received, where the broadcast instruction is generated according to preset broadcast configuration information and status change information of the household appliance.

The method for broadcasting a status of a household appliance in embodiments of the present disclosure may be applied to a target household appliance. The target household appliance may be a household appliance with a voice broadcast function, for example, may be an air conditioner, a refrigerator, a smoke stove and other household appliances with the voice broadcast function.

In embodiments of the present disclosure, the target household appliance may acquire the broadcast instruction generated according to the broadcast configuration information and the status change information of the household appliance, and then broadcast the corresponding status of the household appliance according to the broadcast instruction. As an example, the broadcast instruction may be JavaScript Object Notation (Json) data.

In an embodiment of the present disclosure, the target household appliance may receive and store the broadcast configuration information transmitted by a server, for example, the broadcast configuration information may be stored in a communication circuit such as a Wireless-Fidelity (wifi) circuit. For another example, the broadcast configuration information may be stored in an electronic controller.

The broadcast configuration information may include an appliance identifier and status information, and may further include a broadcast time, broadcast volume, etc., which are not specifically restricted here.

In embodiments of the present disclosure, the target household appliance may form a local area network with other household appliances via the communication circuit such as the wifi circuit. When the status of the household appliance is changed, the household appliance transmits the status change information via the local area network. For example, the household appliance may transmit the status change information to a preset target household appliance via the local area network. For another example, the household appliance may broadcast the status change information via the local area network. The target household appliance receives the status change information, and judges whether the status change information meets a preset broadcast condition according to pre-stored broadcast configuration information, and generates a corresponding broadcast instruction if the broadcast condition is met.

As an example, taking the broadcast configuration information including the appliance identifier, the status information and the broadcast time as an example, the target household appliance may acquire the appliance identifier of the household appliance corresponding to the status change information, and judge whether an appliance identifier of the household appliance matches the appliance identifier in the configuration information; if yes, judge whether the status change information matches the status information in the configuration information; if no, do not generate the broadcast instruction; if yes, judge whether a current time meets the broadcast time; if no, do not generate the broadcast instruction; if yes, generate the corresponding broadcast instruction; if no, do not generate the broadcast instruction.

In an embodiment of the present disclosure, the broadcast instruction may be transmitted to the target household appliance by the server, and the target household appliance receives the broadcast instruction and broadcasts the corresponding status of the household appliance. The broadcast instruction may be generated by the server according to the received status change information of the household appliance, and the broadcast configuration information pre-stored in the server. It should be noted that, the implementation of generating the broadcast instruction according to the broadcast configuration information and the status change information in the above embodiment, is also applicable to the server in this embodiment of the present disclosure, and will not be repeated here.

Therefore, broadcasting a status of the household appliance can be realized via a local area network and a server simultaneously, and thus ensuring reliability of broadcasting the status of the household appliance by redundancy computation.

At step 102, the corresponding status of the household appliance is broadcasted according to the broadcast instruction.

In embodiments of the present disclosure, after receiving the broadcast instruction, the target household appliance may broadcast the corresponding status of the household appliance according to the broadcast instruction. For example, take an air conditioner with a broadcast function as an example, when a status of a humidifier is changed to water lacking, the air conditioner may acquire the broadcast instruction corresponding to the lack of water in the humidifier, and broadcast the water lacking status of the humidifier according to the broadcast instruction to remind a user to add water to the humidifier in time, and thus achieving broadcasting the status of the household appliance by an appliance such as an air conditioner, to inform the user to handle it timely, thereby extending the product function and improving the user experience.

In an embodiment of the present disclosure, after broadcasting the corresponding status of the household appliance according to the broadcast instruction, the target household appliance may further set a corresponding target bit of a state machine to a suspended state according to the broadcast instruction. The state machine is a set of data that records the behavior state, and the target bit corresponds to the broadcast instruction. For example, a target bit A corresponds to the broadcast instruction that the humidifier lacks water, and a target bit B corresponds to the broadcast instruction that a washing machine finishes clothes washing.

Further, after setting the target bit of the state machine to the suspended state, the target household appliance may further judge whether the broadcast instruction currently acquired corresponds to the target bit, if yes, do not broadcast the corresponding status of the household appliance. Specifically, when receiving the broadcast instruction, the target household appliance judges whether the target bit corresponding to the broadcast instruction is in the suspended state, and does not broadcast the corresponding status of the household appliance when the target bit is in the suspended state, thereby avoiding repeatedly broadcasting of the broadcast instruction for a same status change.

Optionally, after setting the target bit of the state machine to the suspended state, the target household appliance may further receive a reset instruction for the target bit of the state machine, and control the target bit to reset. As an example, the target household appliance broadcasts the status that the humidifier lacks water, the user adds water to the humidifier according to broadcast content, then the humidifier transmits corresponding status change information after being added with water, further a corresponding reset instruction is generated according to the status change information; and the target household appliance resets a corresponding target bit according to the reset instruction, and thus broadcasting the corresponding status of the household appliance when receiving the broadcast instruction corresponding to the target bit again.

It should be noted that, the foregoing explanation on the data link transmission process of the broadcast instruction is also applicable to the reset instruction, and will not be repeated here.

According to the method for broadcasting a status of a household appliance in embodiments of the present disclosure, a target household appliance receives a broadcast instruction, where the broadcast instruction is generated according to preset broadcast configuration information and status change information of the household appliance; then broadcasts a corresponding status of the household appliance according to the broadcast instruction, thus achieving broadcasting the status of the household appliance by an appliance such as an air conditioner to inform the user to handle it timely, thereby increasing intelligent level of the household appliance, extending the product function, and improving the user experience. Moreover, broadcasting a status of the household appliance can be realized via a local area network and a server simultaneously, and thus ensuring reliability of broadcasting the status of the household appliance by redundancy computation. In addition, an assigned bit of the state machine is suspended or reset, thus avoiding repeatedly broadcasting of the broadcast instruction for the same status change.

Based on the above embodiments, further, the method for broadcasting a status of a household appliance will be described as follows with respect to the server side.

Figure 2:
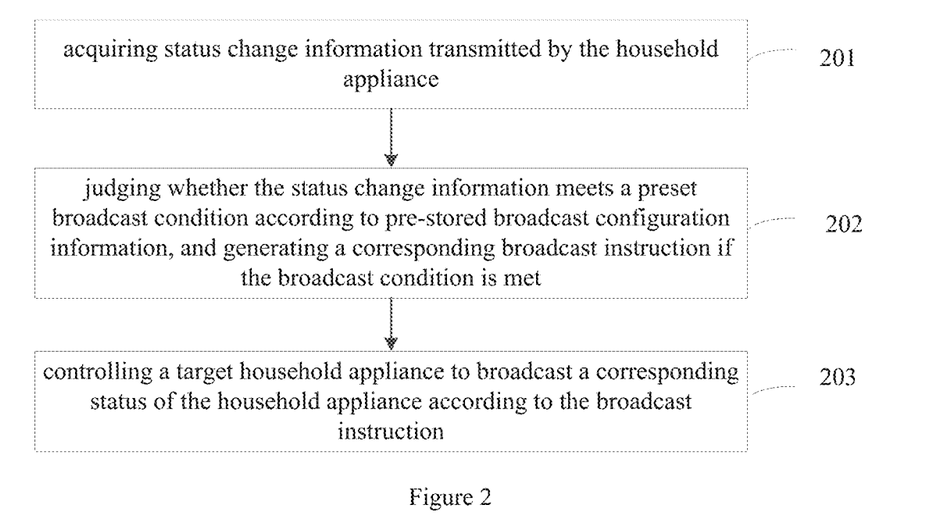
FIG. 2 is a flow chart showing another method for broadcasting a status of a household appliance provided in embodiments of the present disclosure.

FIG. 2 is a flow chart showing another method for broadcasting a status of a household appliance provided in embodiments of the present disclosure. As shown in FIG. 2, the method includes: steps 201 to 203.

At step 201, the status change information transmitted by the household appliance is acquired.

The method for broadcasting a status of a household appliance in embodiments of the present disclosure may be applied to a server.

In embodiments of the present disclosure, the household appliance may transmit its status change information to the server. For example, the humidifier when lacking water transmits its water lacking status to the server, such that the server generates a corresponding broadcast instruction according to the status change information.

In some embodiments of the present disclosure, the user may set the broadcast configuration information by a control device and transmit to the server, and the server receives and stores the broadcast configuration information transmitted by the control device. The control device may be a smart phone or the like.

As an example, the broadcast configuration information may include an appliance identifier and status information, and may further include a broadcast time, broadcast volume, etc. The appliance identifier is configured to identify whether a household appliance is the household appliance which needs to be broadcasted. The status information is configured to determine whether a status corresponding to the status change information is the status which needs to be broadcasted. The broadcast time is configured to determine whether a current time meets the time period in which broadcast is needed.

Optionally, the server may further convert the broadcast configuration information to be in a protocol data type and transmit to the target household appliance, so as to allow the target household appliance to store the broadcast configuration information in the protocol data type. Therefore, broadcast control information adopts protocol data, and the accessible device has a good expansibility.

At step 202, it is judged whether the status change information meets a preset broadcast condition according to pre-stored broadcast configuration information, and the corresponding broadcast instruction is generated if the broadcast condition is met.

In an embodiment of the present disclosure, the server may receive the status change information, judge whether the status change information meets the preset broadcast condition according to the pre-stored broadcast configuration information, and generate the corresponding broadcast instruction if the broadcast condition is met.

As an example, taking the broadcast configuration information including the appliance identifier, the status information and the broadcast time as an example, the server may acquire an appliance identifier of the household appliance corresponding to the status change information, judge whether an appliance identifier of the household appliance matches the appliance identifier in the configuration information; if yes, judge whether the status change information matches the status information in the configuration information; if no, do not generate the broadcast instruction; if yes, judge whether a current time meets the broadcast time; if no, do not generate the broadcast instruction; if yes, generate the corresponding broadcast instruction; if no, do not generate the broadcast instruction.

At step 203, the target household appliance is controlled to broadcast the corresponding status of the household appliance according to the broadcast instruction.

In an embodiment of the present disclosure, the server may transmit the broadcast instruction to each target household appliance, so as to allow the target household appliance to broadcast the corresponding status of the household appliance according to the broadcast instruction. The broadcast instruction may be the Json data, and the target household appliance may be a household appliance with a voice broadcast function, for example, may be an air conditioner, a refrigerator, a smoke stove and other household appliances with the voice broadcast function.

In an embodiment of the present disclosure, the server may further determine a target household appliance identifier of the target household appliance; and then transmit the broadcast instruction to the target household appliance according to the target household appliance identifier, so as to allow the target household appliance to broadcast the corresponding status of the household appliance according to the broadcast instruction. Therefore, it is possible to determine one or more appliances that need to broadcast when there are multiple target household appliances, thus avoiding an appliance that does not need to broadcast from broadcasting, thereby improving the user experience.

In some embodiments of the present disclosure, the server may further receive the status information transmitted by the household appliance, then judge whether the status of the household appliance is changed according to the received status information, and if yes, generate the corresponding broadcast instruction. The status information may be transmitted by the household appliance at the preset time, or when the status of the household appliance is changed.

For example, the household appliance transmits its current status change information to the server at an interval of duration t, and the server receives the status information transmitted by the household appliance and judges whether the status of the household appliance is changed. When receiving status information currently being different from the status information received last time, the server judges that the status of the household appliance is changed, then generates the corresponding broadcast instruction according to the status change; and does not generate the broadcast instruction if the status information is same.

According to the method for broadcasting a status of a household appliance in embodiments of the present disclosure, the server acquires the status change information transmitted by the household appliance, then judges whether the status change information meets a preset broadcast condition according to pre-stored broadcast configuration information, generates a corresponding broadcast instruction if the broadcast condition is met; and further controls the target household appliance to broadcast the corresponding status of the household appliance according to the broadcast instruction, thus achieving that the server controls an appliance, such as an air conditioner, to broadcast the status of the household appliance, to inform the user to handle it timely, thereby extending the product function and improving the user experience. In addition, broadcast control information of the target household appliance adopts protocol data, and the accessible device has a good expansibility.

Reference will be made below in combination with an actual application scenario.

Figure 3:
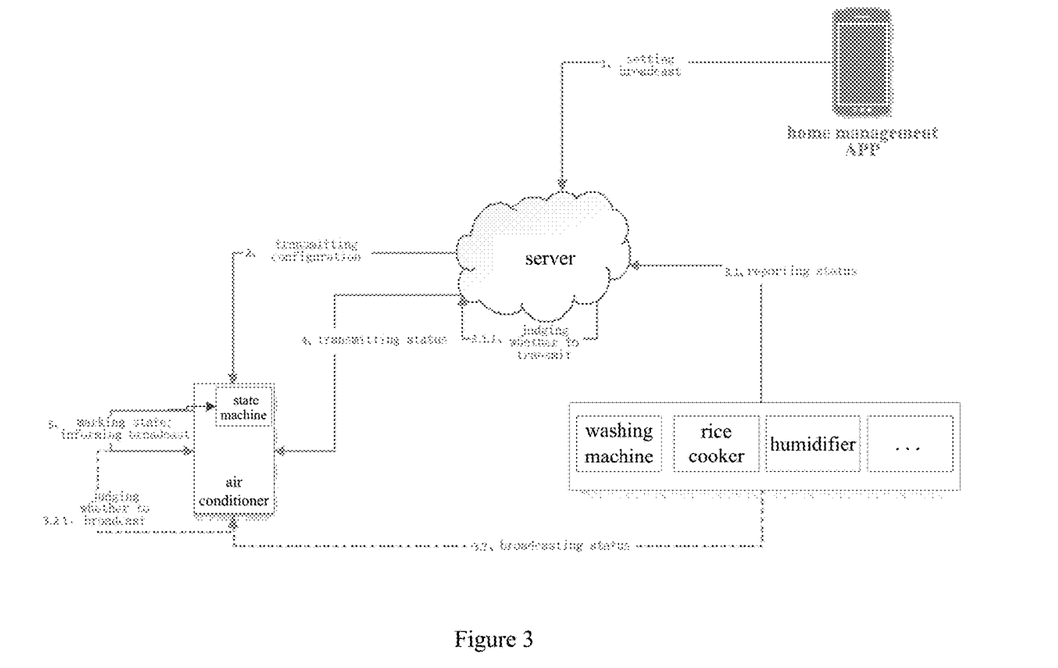
FIG. 3 is a diagram showing an application scenario provided in embodiments of the present disclosure.

FIG. 3 is a diagram showing an application scenario provided in embodiments of the present disclosure. With reference to FIG. 3, the target household appliance is an air conditioner, and the household appliance includes a humidifier, a washing machine, and a rice cooker, etc.

At step 1, broadcast is set. A user sets the configuration information for broadcasting the status of the household appliance via a home management application, for example, the setting item may include: the household appliance, the status of which needs to be broadcasted; a specific status of the household appliance, such as a status of lacking water in a humidifier, a status of finishing rice cooking in a rice cooker, a status of finishing clothes washing in a washing machine, and other statuses of the household appliance that requires to be handled manually; a time period in which broadcast is allowed, such as 08:00 to 10:00, 12:00 to 14:00, or 15:00 to 19:00, which may be set by the user; a broadcast volume, and etc. After setting the broadcast configuration information in the home management application, the user transmits the configuration information to a cloud server.

At step 2, the configuration is transmitted. The server receives and stores the configuration information, converts the configuration information into the protocol data and transmits to the air conditioner. After receiving the protocol data of the configuration information transmitted by the server, the air conditioner stores the data in the wifi circuit, the electronic controller or another data storage.

At step 3.1, a status is reported. When a status of another appliance in home is changed, this appliance reports its status change information to the server.

At step 3.1.1, it is judged whether to transmit. The server receives the status change information of the household appliance and judges whether the status change information meets a broadcast setting requirement according to the stored configuration information.

At step 3.2, the status is broadcasted. When reporting the status change information to the server, this appliance in home may further report its status change information via the local area network.

At step 3.2.1, it is judged whether to broadcast. When the air conditioner receives the status change information reported by another appliance, the air conditioner judges whether the broadcast setting requirement is met according to the protocol data of the configuration information transmitted by the server, and if yes, the air conditioner generates the broadcast instruction.

At step 4, the status is transmitted. The server transmits a status broadcast instruction which meets the broadcast setting requirement to the air conditioner.

At step 5, when receiving the status broadcast instruction transmitted by the server, or judging that the status change information meets the broadcast setting requirement and generating the broadcast instruction, the air conditioner suspends the specified bit of the state machine and broadcasts the status. After the specified bit of the state machine is suspended, the next broadcast instruction will be ignored. In addition, after the user handles the household appliance accordingly, the state machine of the air conditioner will be informed to reset the corresponding specified bit of the state machine, so as to proceed with the status broadcast, where the data link process of the reset is the same as the data link process of information broadcast, thus achieving broadcasting the status of the household appliance by an appliance such as the air conditioner, to inform the user to handle it timely, thereby extending the product function and improving the user experience. Moreover, broadcasting a status of the household appliance can be realized via the local area network and the server simultaneously, and thus ensuring reliability of broadcasting the status of the household appliance by redundancy computation. In addition, an assigned bit of the state machine is suspended or reset, thus avoiding repeatedly broadcasting of the broadcast instruction for the same status change.

For achieving the above embodiments, the present disclosure provides in embodiments an apparatus for broadcasting a status of a household appliance.

Figure 4:
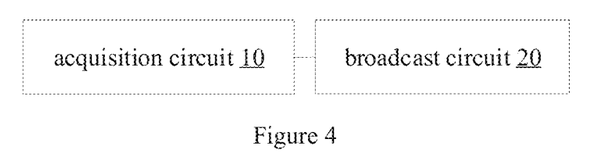
FIG. 4 is a block diagram showing an apparatus for broadcasting a status of a household appliance provided in embodiments of the present disclosure.

FIG. 4 is a block diagram showing an apparatus for broadcasting a status of a household appliance provided in embodiments of the present disclosure. As shown in FIG. 4, the apparatus includes: an acquisition circuit 10 and a broadcast circuit 20.

The acquisition circuit 10 is configured to receive a broadcast instruction, where the broadcast instruction is generated according to preset broadcast configuration information and status change information of the household appliance.

The broadcast circuit 20 is configured to broadcast a corresponding status of the household appliance according to the broadcast instruction.

Optionally, the acquisition circuit 10 is specifically configured to: receive the broadcast instruction transmitted by a server.

Optionally, the acquisition circuit 10 is specifically configured to: receive the status change information transmitted by the household appliance via a local area network; judge whether the status change information meets a preset broadcast condition according to pre-stored broadcast configuration information, and generate a corresponding broadcast instruction if the broadcast condition is met.

Optionally, the apparatus further includes: a storing circuit, configured to: receive the broadcast configuration information transmitted by the server; and store the broadcast configuration information in a communication circuit, and/or store the broadcast configuration information in an electronic controller.

Optionally, the broadcast configuration information includes an appliance identifier, status information corresponding to the appliance identifier, and a broadcast time. The acquisition circuit 10 is specifically configured to: judge whether an appliance identifier of the household appliance matches the appliance identifier in the broadcast configuration information; if yes, judge whether the status change information matches the status information in the broadcast configuration information; if yes, judge whether a current time meets the broadcast time; and if yes, generate the corresponding broadcast instruction.

Optionally, the apparatus further includes: a processing circuit, configured to set a target bit of a state machine to a suspended state according to the broadcast instruction.

Optionally, the processing circuit is further configured to judge whether the broadcast instruction currently acquired corresponds to the target bit, and if yes, not to broadcast the corresponding status of the household appliance.

Optionally, the processing circuit is further configured to: receive a reset instruction for the target bit of the state machine, and control the target bit to reset.

It should be noted that, the explanation on the method for broadcasting a status of a household appliance in the above embodiments, is also applicable to the apparatus for broadcasting a status of a household appliance in embodiments of the present application, and will not be repeated here.

According to the apparatus for broadcasting a status of a household appliance in embodiments of the present disclosure, a target household appliance receives a broadcast instruction by, where the broadcast instruction is generated according to preset broadcast configuration information and status change information of the household appliance; then broadcasts a corresponding status of the household appliance according to the broadcast instruction, thus achieving broadcasting the status of the household appliance, by an appliance such as the air conditioner, to inform the user to handle it timely, thereby extending the product function and improving the user experience. Moreover, broadcasting a status of the household appliance can be realized via a local area network and a server simultaneously, and thus ensuring reliability of broadcasting the status of the household appliance by redundancy computation. In addition, an assigned bit of the state machine is suspended or reset, thus avoiding repeatedly broadcasting of the broadcast instruction for the same status change.

Figure 5:
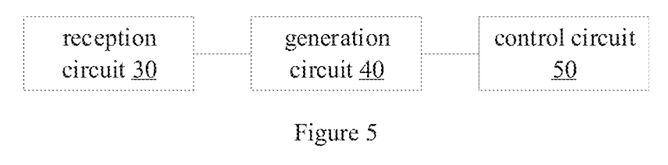
FIG. 5 is a block diagram showing another apparatus for broadcasting a status of a household appliance provided in embodiments of the present disclosure.

FIG. 5 is a block diagram showing another apparatus for broadcasting a status of a household appliance provided in embodiments of the present disclosure. As shown in FIG. 5, the apparatus includes: a reception circuit 30, a generation circuit 40, and a control circuit 50.

The reception circuit 30 is configured to acquire status change information transmitted by the household appliance.

The generation circuit 40 is configured to judge whether the status change information meets a preset broadcast condition according to pre-stored broadcast configuration information, and generate a corresponding broadcast instruction if the broadcast condition is met The control circuit 50 is configured to control a target household appliance to broadcast a corresponding status of the household appliance according to the broadcast instruction.

Optionally, the reception circuit 30 is further configured to: acquire status information transmitted by the household appliance, where the status information is transmitted by the household appliance at a preset time, and/or when a status of the household appliance is changed.

The generation circuit 40 is further configured to: judge whether the status is changed according to the status information, and if yes, generate the corresponding broadcast instruction.

Optionally, the control circuit 50 is specifically configured to: determine a target household appliance identifier of the target household appliance; and transmit the broadcast instruction to the target household appliance according to the target household appliance identifier, so as to allow the target household appliance to broadcast the corresponding status of the household appliance according to the broadcast instruction.

Optionally, the apparatus further includes: a configuration circuit, configured to receive and store the broadcast configuration information transmitted by a control device; convert the broadcast configuration information to be in a protocol data type and transmit to the target household appliance, so as to allow the target household appliance to store the broadcast configuration information in the protocol data type.

Optionally, the broadcast configuration information includes an appliance identifier, status information corresponding to the appliance identifier, and a broadcast time, where the generation circuit 40 is specifically configured to: judge whether an appliance identifier of the household appliance matches the appliance identifier in the broadcast configuration information; if yes, judge whether the status change information matches the status information in the broadcast configuration information; if yes, judge whether a current time meets the broadcast time; and if yes, generate the corresponding broadcast instruction.

It should be noted that, the explanation on the method for broadcasting a status of a household appliance in the above embodiments, is also applicable to the apparatus for broadcasting a status of a household appliance in embodiments of the present application, and will not be repeated here.

According to the apparatus for broadcasting a status of a household appliance in embodiments of the present disclosure, a server acquires status change information transmitted by the household appliance, then judges whether the status change information meets a preset broadcast condition according to pre-stored broadcast configuration information, generates a corresponding broadcast instruction if the broadcast condition is met, and further controls a target household appliance to broadcast a corresponding status of the household appliance according to the broadcast instruction, thus achieving that the server controls an appliance, such as an air conditioner, to broadcast the status of the household appliance, and thus informing the user to handle it timely, thereby extending the product function and improving the user experience. In addition, broadcast control information of the target household appliance adopts protocol data, and the accessible device has a good expansibility.

For achieving the above embodiments, the present disclosure provides an air conditioner appliance, including: an appliance body; and an apparatus for broadcasting a status of a household appliance as described in the above embodiments.

For achieving the above embodiments, the present disclosure provides a computer device, including: a memory; and a processor, where the processor executes, by reading an executable program code stored in the memory, a program corresponding to the executable program code, to implement a method for broadcasting a status of a household appliance as described in the above embodiments.

For achieving the above embodiments, the present disclosure provides a computer program product, wherein an instruction in the computer program product when executed by a processor, implements a method for broadcasting a status of a household appliance as described in the above embodiments.

For achieving the above embodiments, the present disclosure provides a computer-readable storage medium having stored therein a computer program that, when executed by a processor, implements a method for broadcasting a status of a household appliance as described in the above embodiments.

In the specification, it should be understood that terms such as "first" and "second" are used herein for purposes of description and are not intended to indicate or imply relative importance or significance or impliedly indicate quantity of the technical feature referred to. Thus, the feature associated with "first" and "second" may comprise one or more of such feature. In the description of the present disclosure, "a plurality of" means two or more than two, such as two, three, etc., unless specified otherwise.

Reference throughout this specification to "an embodiment," "some embodiments," "an example," "a specific example," or "some examples" means that a particular feature, structure, material, or characteristic described in connection with the embodiment or example is included in at least one embodiment or example of the present disclosure. In this specification, illustrative description with the above phrases does not necessarily refer to the same embodiment or example. Furthermore, the described particular features, structures, materials, or characteristics may be combined in any suitable manner in one or more embodiments or examples. In addition, those skilled in the art can combine different embodiments or examples and features in different embodiments or examples as long as they do not conflict with each other.

Although explanatory embodiments have been shown and described, it would be appreciated that the above embodiments are illustrative and should not be construed as limiting the present disclosure, and those of ordinary skills in the art can make changes, alternatives, and modifications to the embodiments in the scope of the present disclosure.

What is claimed is:

1. A status broadcasting method comprising:
   transmitting status change information to a remote device,
   receiving from the remote device a broadcast instruction, the broadcast instruction being generated according to preset broadcast configuration information and status change information of a household appliance; and
   broadcasting a corresponding status of the household appliance according to the broadcast instruction.

2. The method according to claim 1, wherein receiving the broadcast instruction includes:
   receiving the broadcast instruction transmitted by a server.

3. The method according to claim 1, wherein receiving the broadcast instruction includes:
   receiving the status change information transmitted by the household appliance via a local area network; and
   judging whether the status change information meets a preset broadcast condition according to pre-stored broadcast configuration information, and generating the broadcast instruction in response to the broadcast condition being met.

4. The method according to claim 3, further comprising:
   receiving the broadcast configuration information transmitted by the server; and
   storing the broadcast configuration information in at least one of a communication circuit or an electronic controller.

5. The method according to claim 3, wherein:
   the broadcast configuration information includes an appliance identifier, status information corresponding to the appliance identifier, and a broadcast time; and
   judging whether the status change information meets the preset broadcast condition and generating the broadcast instruction in response to the broadcast condition being met includes:
      judging whether an appliance identifier of the household appliance matches the appliance identifier in the broadcast configuration information;
      in response to the appliance identifier of the household appliance matching the appliance identifier in the broadcast configuration information, judging whether the status change information matches the status information in the broadcast configuration information;
      in response to the status change information matching the status information in the broadcast configuration information, judging whether a current time meets the broadcast time; and
      in response to the current time meeting the broadcast time, generating the broadcast instruction.

6. The method according to claim 1, further comprising, after broadcasting the corresponding status of the household appliance:
   setting a target bit of a state machine to a suspended state according to the broadcast instruction.

7. The method according to claim 6, further comprising, after setting the target bit of the state machine to the suspended state:
   judging whether a currently-acquired broadcast instruction corresponds to the target bit; and
   in response to the currently-acquired broadcast instruction corresponding to the target bit, not broadcasting the corresponding status of the household appliance.

8. The method according to claim 6, further comprising, after setting the target bit of the state machine to the suspended state:
   receiving a reset instruction for the target bit of the state machine; and
   controlling the target bit to reset.

9. A non-transitory computer-readable storage medium storing a computer program that, when executed by a processor, causes the processor to perform the status broadcasting method according to claim 1.

10. A status broadcasting method comprising:
acquiring status change information transmitted by a household appliance;
judging whether the status change information meets a preset broadcast condition according to pre-stored broadcast configuration information, and
generating a broadcast instruction in response to the broadcast condition being met; and
transmitting the broadcast instruction to a target household appliance,
controlling the target household appliance to broadcast a corresponding status of the household appliance according to the broadcast instruction.

11. The method according to claim 10, further comprising:
acquiring status information transmitted by the household appliance at a preset time and/or when a status of the household appliance is changed;
wherein judging whether the status change information meets the preset broadcast condition and generating the broadcast instruction in response to the broadcast condition being met includes judging whether the status of the household appliance is changed according to the status information and generating the broadcast instruction in response to the status of the household appliance being changed.

12. The method according to claim 10, wherein controlling the target household appliance to broadcast the corresponding status of the household appliance according to the broadcast instruction includes:
determining a target household appliance identifier of the target household appliance; and
transmitting the broadcast instruction to the target household appliance according to the target household appliance identifier, so as to allow the target household appliance to broadcast the corresponding status of the household appliance according to the broadcast instruction.

13. The method according to claim 10, further comprising:
receiving and storing the broadcast configuration information transmitted by a control device; and
converting the broadcast configuration information to be in a protocol data type and transmitting to the target household appliance, so as to allow the target household appliance to store the broadcast configuration information in the protocol data type.

14. The method according to claim 10, wherein:
the broadcast configuration information includes an appliance identifier, status information corresponding to the appliance identifier, and a broadcast time; and
judging whether the status change information meets the preset broadcast condition and generating the broadcast instruction in response to the broadcast condition being met includes:
judging whether an appliance identifier of the household appliance matches the appliance identifier in the broadcast configuration information;
in response to the appliance identifier of the household appliance matching the appliance identifier in the broadcast configuration information, judging whether the status change information matches the status information in the broadcast configuration information;
in response to the status change information matching the status information in the broadcast configuration information, judging whether a current time meets the broadcast time; and
in response to the current time meeting the broadcast time, generating the broadcast instruction.

15. A non-transitory computer-readable storage medium storing a computer program that, when executed by a processor, causes the processor to perform the status broadcasting method according to claim 10.

16. A device comprising:
a memory storing a program; and
a processor configured to execute the program to:
transmitting status change information to a remote device,
receive a broadcast instruction from the remote device, the broadcast instruction being generated according to preset broadcast configuration information and status change information of a household appliance;
broadcast a corresponding status of the household appliance according to the broadcast instruction.

17. The device according to claim 16, wherein the processor is further configured to execute the program to:
receive the broadcast instruction transmitted by a server.

18. The device according to claim 16, wherein the processor is further configured to execute the program to:
receive the status change information transmitted by the household appliance via a local area network; and
judge whether the status change information meets a preset broadcast condition according to pre-stored broadcast configuration information, and generate the broadcast instruction in response to the broadcast condition being met.

19. An air conditioner appliance comprising:
an appliance body; and
the device according to claim 16.

* * * * *